United States Patent
Petit et al.

(10) Patent No.: US 12,541,605 B2
(45) Date of Patent: Feb. 3, 2026

(54) SECURE TOKENIZED DATA EXCHANGE

(71) Applicant: Capital One Services, LLC, McLean, VA (US)

(72) Inventors: Alain S. Petit, Glen Valley, VA (US); Rohit Joshi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 13 days.

(21) Appl. No.: 18/639,038

(22) Filed: Apr. 18, 2024

(65) Prior Publication Data
US 2025/0328661 A1 Oct. 23, 2025

(51) Int. Cl.
G06F 21/60 (2013.01)

(52) U.S. Cl.
CPC .................................. G06F 21/606 (2013.01)

(58) Field of Classification Search
CPC  G06Q 20/385; G06Q 20/401; G06F 21/6254; G06F 21/6245; G06F 21/606; H04L 9/3213
USPC ......................................................... 726/26
See application file for complete search history.

(56) References Cited

U.S. PATENT DOCUMENTS

| | | | |
|---|---|---|---|
| 9,081,978 B1 | 7/2015 | Connolly et al. | |
| 9,785,797 B2 | 10/2017 | Rozenberg et al. | |
| 10,089,493 B2 | 10/2018 | Rozenberg et al. | |
| 10,623,181 B2 | 4/2020 | Iyer et al. | |
| 11,349,661 B2 | 5/2022 | Williamson et al. | |
| 11,520,925 B1* | 12/2022 | Sumner | G06F 21/6245 |
| 12,204,629 B2 | 1/2025 | Jaiman et al. | |
| 12,380,245 B1* | 8/2025 | Buckingham | H04L 9/0894 |
| 2014/0177825 A1 | 6/2014 | Mattsson et al. | |
| 2017/0344756 A1 | 11/2017 | Mattsson et al. | |
| 2019/0207754 A1* | 7/2019 | Iyer | H04L 9/0877 |
| 2019/0342088 A1* | 11/2019 | Eidson | H04L 9/14 |
| 2020/0034832 A1* | 1/2020 | Korpal | G06Q 20/385 |
| 2020/0183823 A1 | 6/2020 | Arvind et al. | |
| 2020/0374120 A1 | 11/2020 | Stanley et al. | |
| 2023/0019728 A1 | 1/2023 | Grover et al. | |
| 2023/0342481 A1* | 10/2023 | Nikoghossian | G06F 21/62 |
| 2024/0256513 A1 | 8/2024 | Reichinger | |
| 2025/0252205 A1 | 8/2025 | Cheng et al. | |

OTHER PUBLICATIONS

Types of Tokenization: Vault and Vaultless, Encryption Consulting, date of publication unknown but, prior to Feb. 1, 2024, 6 pages.

(Continued)

*Primary Examiner* — Meng Vang
(74) *Attorney, Agent, or Firm* — Banner & Witcoff, Ltd.

(57) ABSTRACT

Systems, methods, and apparatuses are described for secure transfer of tokenized data from a sender to a recipient without disclosing tokenization schemas of either party. A computing device may receive a detokenization algorithm associated with a sender and tokenized data. The computing device may generate plain data by processing the first tokenized data using the detokenization algorithm. The computing device may clear memory, receive a tokenization algorithm associated with a recipient, and generate tokenized data by processing the plain data using the tokenization algorithm. The computing device may then send the tokenized data to the recipient.

20 Claims, 4 Drawing Sheets

(56) References Cited

OTHER PUBLICATIONS

Vaultless Tokenization vs. Vault Tokenization, <<https://www.solulab.com/>>, first date of publication unknown but, prior to Feb. 1, 2024, 25 pages.
Protegrity Vaultless Tokenization, FAQs, protegrity, first date of publication unknown but, prior to Feb. 1, 2024, 5 pages.
"Vaultless" or "Reversible" Tokenization—Is it really just encryption with a fancy marketing name?, Information Security, Jun. 8, 2018, 4 pages.
Jul. 14, 2025—(WO) International Search Report and Written Opinion—App No. PCT/US2025/025191.
Jul. 1, 2025—(WO) International Search Report and Written Opinion—App No. PCT/US2025/025691.
Rajaa, Ramita, "Strike a Balance Between Privacy and Personalization with PII Tokenized Sending," MoEngage Blog, Jul. 26, 2023, 5 pages.
Apr. 19, 2023, How Data Tokenization Plays an Effective Role in Data Security, PROTECTO, 7 pages.
Tokenization vs. Encryption, Skyhigh Security, first date of publication unknown but, prior to Feb. 1, 2024, 6 pages.
Tokenized Settings, salesforce, date of publication unknown but, prior to Feb. 1, 2024, 4 pages.

\* cited by examiner

SECURE TOKENIZED DATA EXCHANGE

FIELD OF USE

Aspects of the disclosure relate generally to data security. More particularly, aspects described herein describe a process for the secure transfer of tokenized data from a sender to a recipient without disclosing tokenization schemas of either party.

BACKGROUND

Organizations often need to store private data (e.g., credit card numbers, social security numbers) in compliance with various standards, such as the Payment Card Industry Data Security Standard (PCI DSS). One approach to securely storing such private data in compliance with PCI DSS is tokenization. Tokenization replaces any data, including sensitive data, with a token. Tokenization can be reversible (meaning that reversible tokens are mapped to data in a way such that the reversible tokens can be processed using a detokenization algorithm to return the original data) or irreversible (meaning that it is impossible for any party to recreate the original value from an irreversible token). The approach taken to generate such tokens is quite different: while a reversible token might be generated using an algorithm with various steps (e.g., replacing characters with other characters based on a table) that can be reversed (e.g., performing those steps in reverse), irreversible tokens are often generated using one-way algorithms.

In certain circumstances, a sending organization (e.g., a retailer) might wish to share secure tokenized data (e.g., a credit card number) with a recipient organization (e.g., a bank). That said, the tokenized data cannot simply be sent over as-is: each organization ideally secretly maintains its own tokenization algorithms and processes. As such, to transfer such data, the sending organization must (if even possible) internally convert tokenized data back to plain data, then send that plain data to the recipient organization, which might then re-tokenize the data in accordance with their own tokenization algorithms. This process introduces significant data security risks, as it effectively means that private data is being transmitted over potentially insecure networks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to securely transferring tokenized data from a sender to a recipient without disclosing tokenization schemas of either party. This process may involve use of a third-party server configured to provide strict integrity and confidentiality for each the sender and the recipient. In this manner, the sender cannot have any information regarding a recipient's tokenization process and the recipient cannot have any information related to the tokenization process of the sender. This process (e.g., including an HTTPS session initiated by the sender) may be configured in its own memory space to handle the request and detokenize the data received. The third-party server may then create another memory allocation containing data to be tokenized for the recipient, and the preceding segment (e.g., including information relating to the sender's tokenization scheme) may be wiped clean. A new memory allocation may then be used to prepare data to be sent to the recipient, such as by tokenizing the data in accordance with the recipient's tokenization scheme.

Stated somewhat differently, aspects described herein relate to securely transferring tokenized data from a sender to a recipient without disclosing tokenization schemas of either party. This process involves use of a third-party server with a temporary memory that receives tokenized data and detokenization algorithm information from a sender, generates plain data, and then wipes its memory of the detokenization algorithm information before receiving tokenization algorithm information from the recipient and re-tokenizing the plain data. With this approach, at no point does the third-party server contain information about either tokenization (and/or detokenization) algorithm at the same time, ensuring that both parties' privacy is maintained during the data transfer process. Moreover, this ensures that transmissions to and from the third-party server are tokenized, meaning that data privacy is preserved throughout the detokenization and re-tokenization process. In other words, because the plain data is only ephemerally stored on temporary memory for an inconsequential amount of time, the risk of such data becoming compromised is lowered significantly.

More particularly, a computing device may store, in a temporary memory, a detokenization algorithm associated with the sender. The computing device may receive, from the sender, first tokenized data, wherein the first tokenized data was tokenized in accordance with a first tokenization algorithm associated with the sender. The computing device may then generate plain data by processing the first tokenized data using the detokenization algorithm. To generate that plain data, the computing device may perform one or more steps of the first tokenization algorithm in reverse. The computing device may then remove, from the temporary memory, the detokenization algorithm associated with the sender. The computing device may store, in the temporary memory, a second tokenization algorithm associated with the recipient, wherein the second tokenization algorithm is different from the first tokenization algorithm. Then, the computing device may generate second tokenized data by processing, using the second tokenization algorithm, the plain data, send, to the recipient, the second tokenized data, and remove, from the temporary memory, the second tokenization algorithm, the plain data, and the second tokenized data. As part of generating that second tokenized data, the computing device may replace, based on a table, one or more characters of the plain data with one or more second characters.

The two tokenization algorithms (that is, the first tokenization algorithm of the sender and the second tokenization algorithm of the recipient) may be different in a variety of ways. For example, the first tokenization algorithm may be configured to create a unique token for input data, and the second tokenization algorithm may be configured to create a different unique token for the same input data. This is quite desirable, as it improves security: if a tokenization algorithm were shared widely, then such sharing might increase the possibility that a nefarious individual could detokenize tokenized data.

In some cases, the computing device may condition steps such as receipt of tokenized data, generation of plain data, and/or transmission of tokenized data on authentication of the sender and/or recipient. For example, the computing device may receive, from the sender, authentication credentials, and the computing device may generate the plain data based on a determination that the authentication credentials are valid.

One advantage of the present disclosure is that it may permit the training of a machine learning model (e.g., a machine learning model implemented via an artificial neural network) using tokenized data in a manner that uses a unique tokenization scheme for that machine learning model, rather than using the tokenization scheme used for other data processing. For example, the second tokenization algorithm may be associated with a machine learning model, and sending the second tokenized data may comprise training the machine learning model based on the second tokenized data.

As indicated previously, one privacy-preserving aspect of the present disclosure is that the temporary memory does not maintain information about two different tokenization algorithms at the same time. To ensure this process, the temporary memory might be routinely wiped in a secure manner. For example, as part of removing the detokenization algorithm from memory, the computing device may wipe the temporary memory and/or replace all values of the temporary memory with dummy values.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
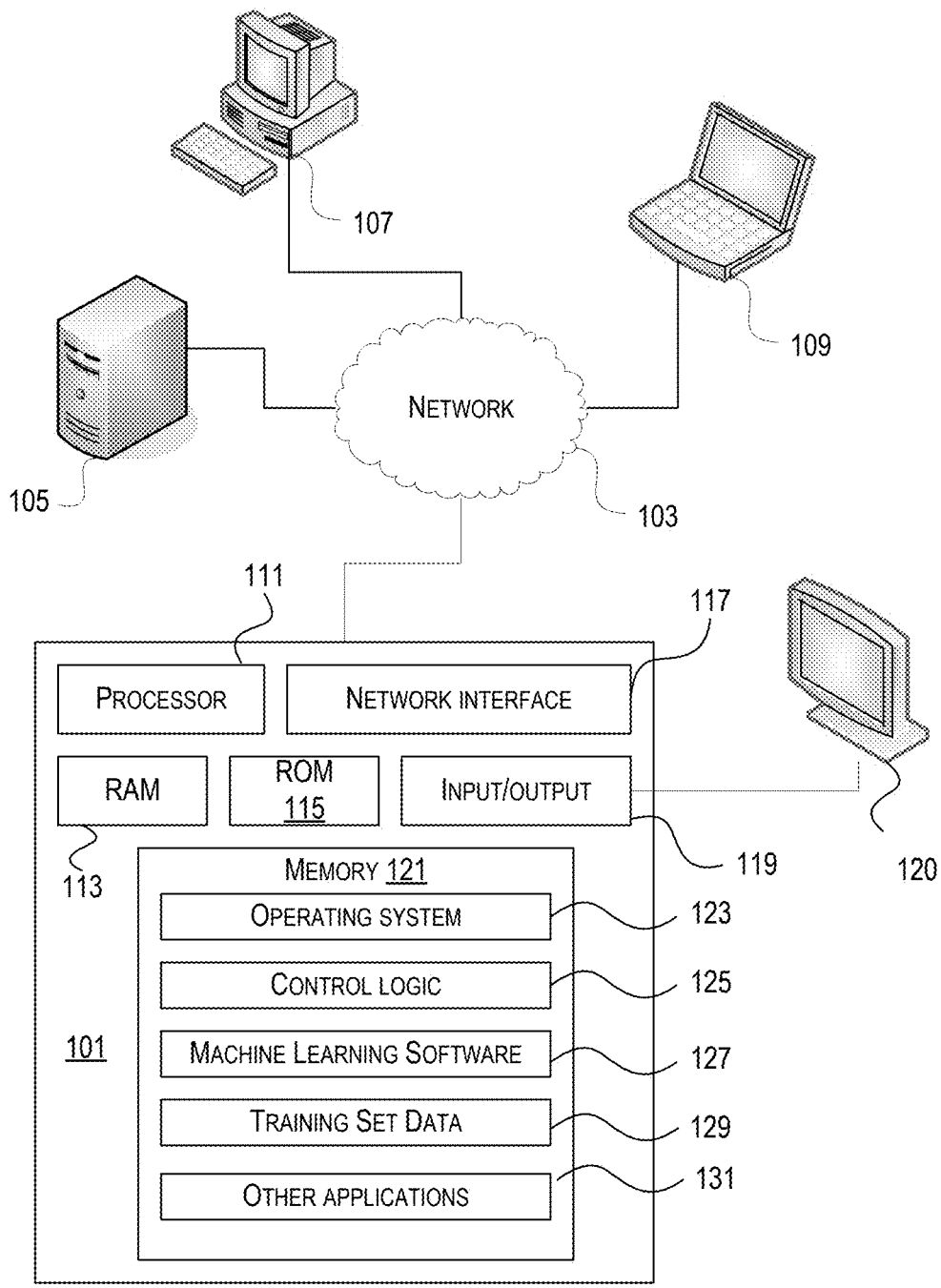
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, different organizations may maintain (e.g., store) private data using different tokenization schemes. For example, one organization might use a first tokenization algorithm to tokenize data, whereas another organization might use a wholly different tokenization algorithm to tokenize data. This presents a problem when those organizations try to share data: the tokenized data itself cannot be shared, as—even if the tokenization algorithm is reversible—neither party knows the other party's tokenization schema. This often forces organizations to de-tokenize and send plain data to one another, which presents significant data security risks during transmission. This issue even crops up in the context of machine learning: it can be quite undesirable to train a machine learning model using the same tokenization algorithm as used to store data because doing so could potentially expose aspects of the tokenization algorithm to the public (especially if the machine learning malfunctions or can be reverse engineered), meaning that it is often desirable to de-tokenize and re-tokenize data using a different tokenization algorithm before using that data to train a machine learning model.

To remedy those and other issues, aspects described herein describe a third-party server that uses temporary memory to de-tokenize data and re-tokenize data in a manner that never maintains two different tokenization schemas at the same time. In this manner, organizations can easily exchange tokenized data without transmitting the un-tokenized data over any networks, and can ensure that their tokenization algorithms are never potentially disclosed to external parties. To achieve this process, the third-party server is configured to receive tokenized data and detokenization algorithm information from a sender, convert the tokenized data to plain text, clear its memory of any information about the detokenization algorithm, and then receive, from a recipient, tokenization algorithm information that can be used to convert that plain text into tokenized data.

Aspects described herein improve the functioning of computers by improving data and network security. Tokenization is one approach to securing private data stored by computing devices, but it has limitations: for instance, reversible tokenization algorithms can be risky in that they (as their name implies) can be reversed, including being reversed by nefarious parties. That said, reversible tokenization is still sometimes necessary where data needs to be shared. To avoid such risks, aspects describe herein configure multiple computing devices in a way that allows processing and conversion of tokenized data without requiring that the data be transmitted in compromised ways (e.g., transmitted in plain text over a network) and without exposing other sensitive information (e.g., tokenization algorithm information) to other parties. The result is significantly more secure data transmissions, which is a clear improvement to the functioning of computers.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
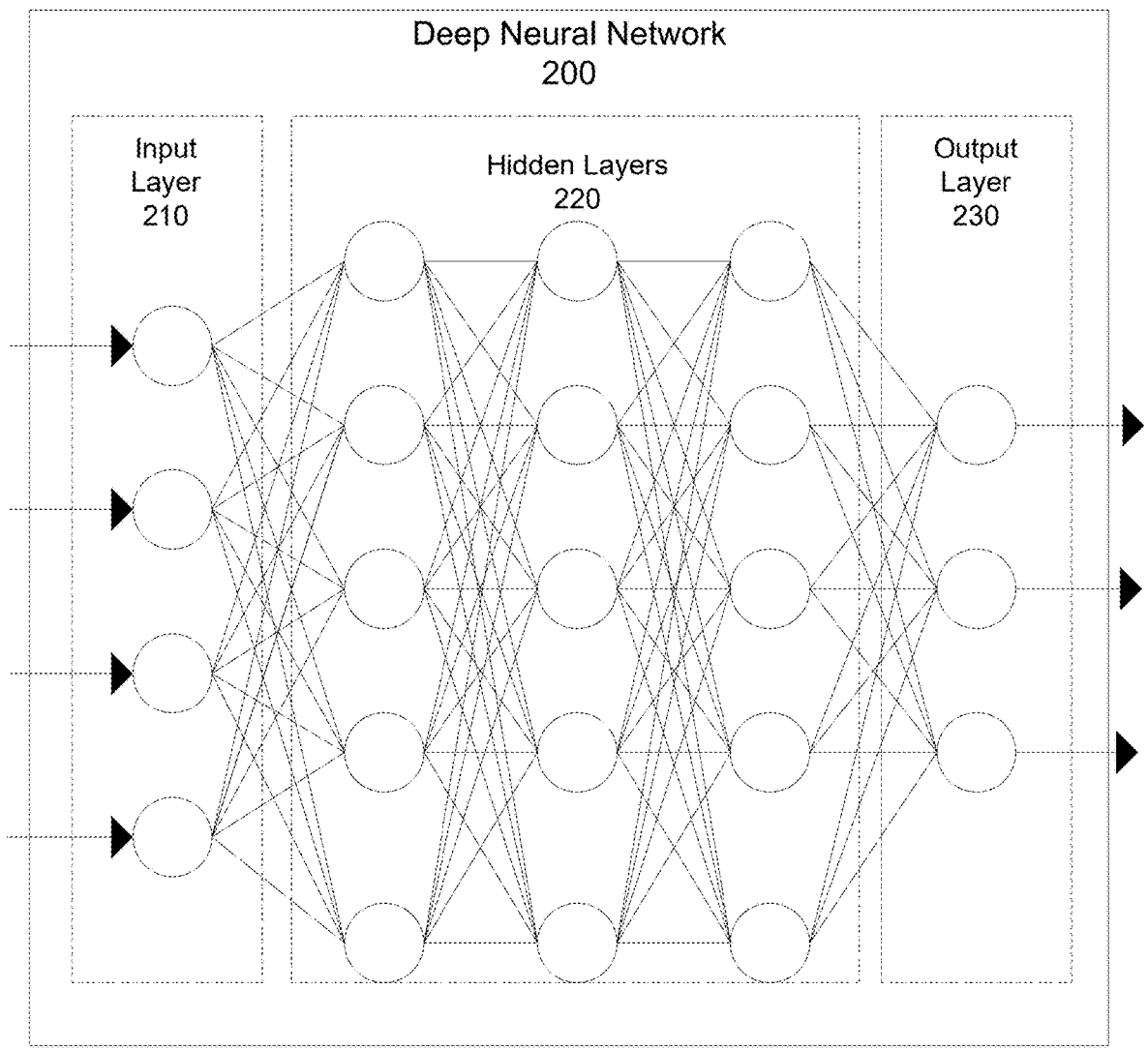
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
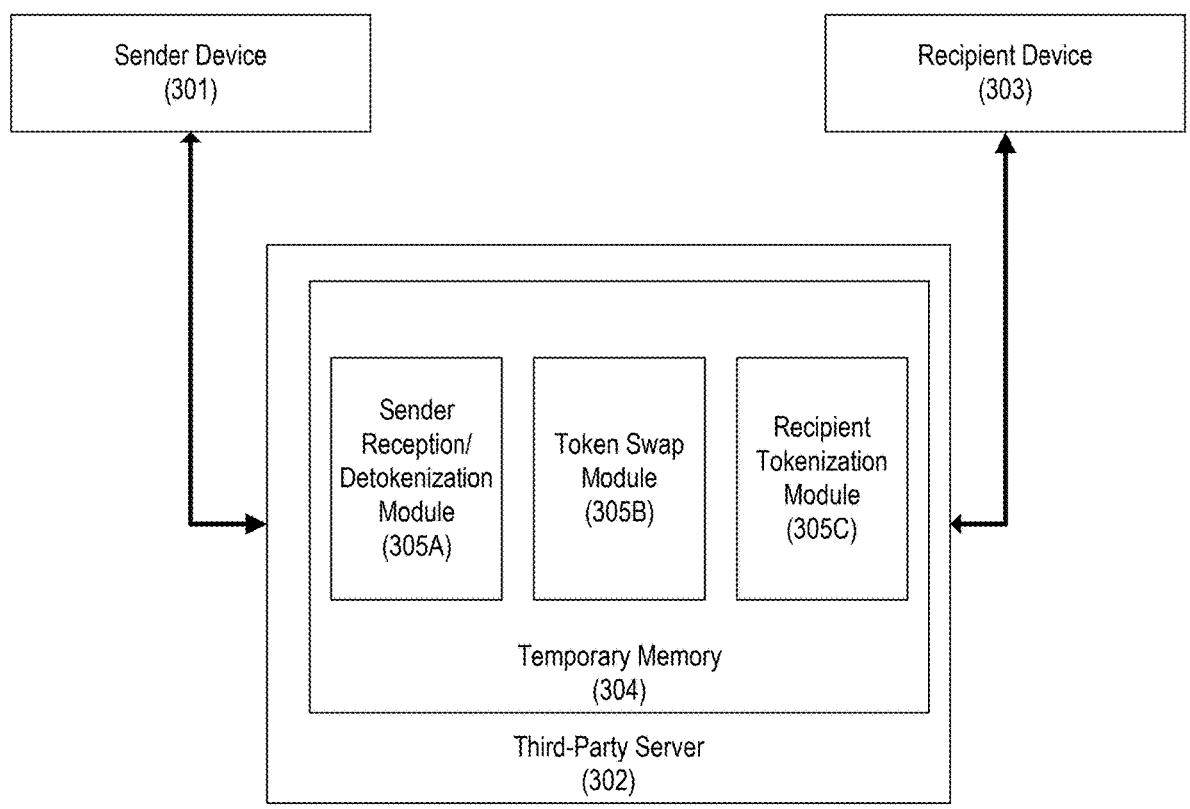
FIG. 3 depicts an illustrative system including a sender device, a third-party server with temporary memory, and a recipient device.

FIG. 3 depicts a system comprising a sender device 301, a third-party server 302 with temporary memory 304, and a recipient device 303. The third-party server 302 may be configured to receive, from the sender device 301, tokenized data and/or information about detokenization algorithms associated with the sender device 301. The third-party server 302 may be configured to generate plain data by processing, using the detokenization algorithm associated with the sender device 301, tokenized data. That plain data might then be re-tokenized using a tokenization algorithm received from the recipient device 303, and the re-tokenized data (that is, the data tokenized in accordance with a different tokenization algorithm) may be sent to the recipient device 303.

The third-party server 302 is shown with temporary memory 304. The temporary memory 304 may comprise random-access memory or similar memory configured to temporarily store information such as tokenization algorithms, detokenization algorithms, tokenized data, and plain data. The third-party server 302 may keep the temporary memory 304 logically or physically separate from other memory, and may periodically wipe and/or otherwise reset the temporary memory 304. For example, the third-party server 302 may be configured to wipe and/or otherwise reset the temporary memory 304 every time that a tokenization algorithm and/or detokenization algorithm is used, such that a given algorithm is never preserved in memory for longer than is necessary. As another example, the third-party server 302 may be configured to wipe and/or otherwise reset the temporary memory 304 after generating plain data by processing tokenized data using a detokenization algorithm and/or after transmitting tokenized data generated by processing plain data using a tokenization algorithm. Because the plain data must be temporarily preserved in order to be tokenized, wiping and/or otherwise resetting the temporary memory 304 need not suggest deletion of the plain data. That said, the temporary memory 304 may be configured to store only what is absolutely necessary to perform necessary detokenization/tokenization steps, keeping in mind that tokenization and/or detokenization algorithms from different organizations should never be stored simultaneously. The temporary memory 304 may be wiped by, for example, deleting all content in memory (e.g., converting all bits to 0), by replacing values of the temporary memory with dummy values (e.g., a random series of bits), and/or by replacing data in the temporary memory with false data (e.g., fake tokenization algorithms, fake tokenized data, fake plain data). In other words, it may be desirable to ensure that the temporary memory 304, unless being actively used to detokenize/tokenize data, does not contain any real data from any organization(s).

The temporary memory 304 is shown depicting a sender reception/detokenization module 305A, a token swap module 305B, and a recipient tokenization module 305C. These modules illustrate how the temporary memory 304 may handle tokenization processes without exposing the sender (e.g., the sender device 301) and/or the recipient (e.g., the recipient device 303) to the other party's tokenization scheme. For example, the sender reception/detokenization module 305A may be configured to detokenize tokenized data received from the sender device 301 and pass it on to a separate party of the memory (e.g., the token swap module 305B). The separate part of the memory (e.g., the token swap module 305B) may then receive the detokenized data and, in some cases, wipe other parts of the temporary memory 304 (e.g., the portion associated with the sender reception/detokenization module 305A). The token swap module 305B may then pass on the detokenized data to the recipient tokenization module 305C, which may tokenize the data in accordance with a tokenization scheme corresponding to the recipient (e.g., the recipient device 303). The temporary memory 304 may then be wiped further to protect the recipient's tokenization information from being inadvertently disclosed later.

Figure 4:
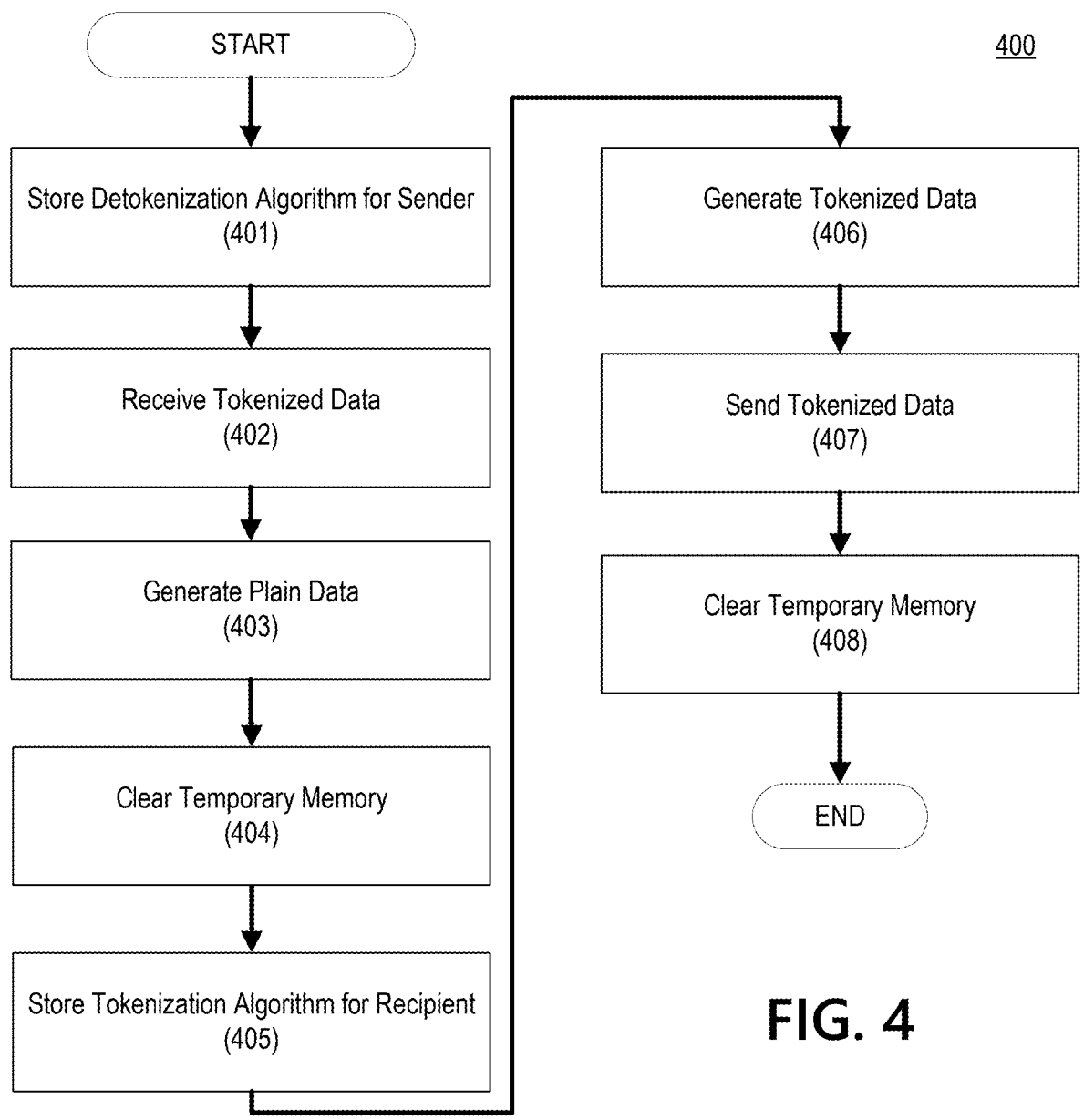
FIG. 4 depicts steps of a method for securely transferring tokenized data from a sender to a recipient without disclosing tokenization schemas of either party.

FIG. 4 depicts a method 400 comprising steps for securely transferring tokenized data from a sender to a recipient without disclosing tokenization schemas of either party. The method 400 may be performed by a computing device, such as any one of the devices described with respect to FIG. 1, FIG. 2 and/or FIG. 3, such as the third-party server 302, the sender device 301, and/or the recipient device 303. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, a computing device (e.g., the third-party server 302) may store a detokenization algorithm for a sender. The detokenization algorithm might be received from an external source, such as one or more computing devices associated with a sender, and might be stored in a temporary memory such as the temporary memory 304. For example, the computing device may store, in a temporary memory, a detokenization algorithm associated with the sender. A detokenization algorithm may comprise any information (e.g., a key, a series of steps, a table of values, the identification of a particular tokenization schema) that may be used to convert tokenized data back into plain data. In this manner, the detokenization algorithm need not be an executable or similar computing file, but might only be the requisite information usable by the computing device to convert tokenized data back into plain data.

Tokenization algorithms and detokenization algorithms may be identical or nearly the same. For example, some tokenization algorithms use a table of values to convert one or more individual characters (e.g., "1", "ta") into different characters (e.g., randomly-selected but consistent values such as "ox1," "2"). As such, possession of the table of values allows both tokenization and de-tokenization—the table just might be used slightly differently. In some other circumstances, the detokenization algorithm may involve performing steps of a tokenization algorithm in reverse. As a simple example, if the tokenization algorithm involves a shift cipher (e.g., shifting forward two places, such that "A" becomes "C" and so on), then the detokenization algorithm may involve shifting in the opposite direction (e.g., shifting backward two places, such that "C" becomes "A" and so on).

Some tokenization algorithms may be configured to store plain data on a database and generate tokens that point to that plain data. Such tokenization algorithms are unique in that the token itself (e.g., "ID3") might not, standing alone, be usable to determine the data (e.g. "John A. Smith"), but instead are usable to query a remote server to retrieve the plain data. The processes herein can operate using these algorithms, as will be described further below, though the tokenization and detokenization processes require queries to such remote servers. For example, the process of detokenization in this context may involve querying a sender's server to retrieve the plain data. This can undesirably involve some transmission of the plain data over a network (since the sender's server would send the plain data as a response to a query using the token); however, it limits the transmissions to preestablished connections between the computing device and known other servers, and those transmissions can be encrypted and/or otherwise protected as needed.

In step 402, the computing device may receive tokenized data. The tokenized data may be any data that has been converted in accordance with a tokenization algorithm, such as a tokenization algorithm associated with a sender. For example, the computing device may receive, from the sender, first tokenized data, and the first tokenized data may have been tokenized in accordance with a first tokenization algorithm associated with the sender. The data may, but need not, be private or otherwise secret. For instance, the tokenized data might be a credit card number, a social security number, or the like.

In step 403, the computing device may generate plain data. This plain data may be generated by processing the tokenized data received in step 402 with the detokenization algorithm stored in step 401. For example, the computing device may generate plain data by processing the first tokenized data using the detokenization algorithm. The plain data may be stored in a temporary memory of the computing device. This storage is intentionally temporary, as the plain data will be ultimately re-tokenized and transmitted as quickly as possible. After all, excessively long storage of the data might, in extreme circumstances, expose it to a greater chance of being accessed by unauthorized parties. In the context where the detokenization algorithm involves querying a remote server using a token to retrieve plain data, the generation of the plain data may involve one or more such queries.

As used herein, plain data may refer to any detokenized data, though the data itself might still be obfuscated. For instance, plain data for a credit card number might not include all sixteen digits, even if it is properly detokenized. As another example, plain data might indicate a city and state of an address, but not a full street address.

In step 404, the computing device may clear temporary memory. For example, the computing device may remove, from the temporary memory, the detokenization algorithm associated with the sender. In this manner, the computing device is configured to temporarily store the plain data (necessary for later steps) but remove any information about the tokenization schema of any organizations. This process may comprise using an algorithm to zero out the temporary memory, fill the temporary memory with random values (e.g., random bits), or the like. This process may additionally and/or alternatively comprise removing power from the temporary memory and thereby causing the temporary memory to lose all contents.

In step 405, the computing device may store a tokenization algorithm associated with a recipient. For example, the computing device may store, in the temporary memory, a second tokenization algorithm associated with the recipient. The second tokenization algorithm may be different from the first tokenization algorithm. The result of this receipt is that the temporary memory of the computing device may store a tokenization algorithm associated with the recipient and the plain data, but not any information about the detokenization algorithm associated with the sender. In this manner, security is maintained: at no point do the sets of data involving tokenization of different organizations ever coexist in the same memory.

The storing of a tokenization algorithm associated with a recipient may be based on a determination that all information associated with the detokenization algorithm is unrecoverable from the temporary memory. This step may be critical to ensuring that tokenization algorithms associated with different entities are stored at the same time, however infinitesimal. To perform this step, the computing device may test the memory (e.g., confirm that the memory has been zeroed out except for the portion associated with the plain data), may perform one or more additional wiping algorithms on the memory (e.g., replacing the memory with random values multiple times), or the like. Additionally and/or alternatively, this process may include processing the plain text to ensure that no portion of the plain text remotely relates to detokenization and/or tokenization. For example, the computing device may process the plain data and proactively remove and/or edit any text that appears to relate to an algorithm, code, or the like.

A tokenization algorithm associated with a recipient may be different from a tokenization algorithm associated with a sender. For example, a sender's tokenization algorithm may be configured to create a unique token for input data, whereas a recipient's tokenization algorithm may be configured to create a wholly different unique token for the same or similar input data. As another example, the sender's tokenization algorithm may be reversible, whereas the recipient's tokenization algorithm need not be reversible. As yet another example, the sender's tokenization algorithm may use all or portions of an algorithm configured to create a hash value, whereas the recipient's tokenization algorithm may store plain data on a server and generate unique tokens that point to the stored plain data.

In step 406, the computing device may generate tokenized data based on the plain data. This may involve processing the plain data based on the tokenization algorithm received in step 405. For example, the computing device may generate second tokenized data by processing, using the second tokenization algorithm, the plain data. In the context where the tokenization algorithm of the recipient involves generation of a token that points to stored plain data in a database, the computing device may perform step 406 by storing the plain data in the database and generating the token that points to the stored plain data in the database.

In step 407, the computing device may send the tokenized data. This may comprise transmitting the tokenized data to the intended recipient. For example, the computing device may send, to the recipient, the second tokenized data.

The process described above may be performed in order to provide tokenized training data to a machine learning model, such as may be implemented using the artificial neural network described above with respect to FIG. 2. For example, the computing device may receive (as part of step 402) tokenized data in accordance with a tokenization schema for storage, but ultimately detokenize and re-tokenize the data in accordance with a tokenization schema for a machine learning model. This approach has numerous advantages: it ensures that the machine learning model is not provided volumes of data that might permit reverse engineering of the storage-based tokenization schema, it allows for uses of tokenization schemas that improve the accuracy and processing of machine learning, and the like. As such, the second machine learning model might be associated with its own tokenization algorithm, and the process in step 407 might involve training a machine learning model. For instance, step 407 might involve sending the tokenized data to one or more input nodes of an artificial neural network as part of a training and/or testing process.

In step 408, the computing device may clear temporary memory. For example, the computing device may remove, from the temporary memory, the second tokenization algorithm, the plain data, and the second tokenized data.

All or portions of the above steps may be conditioned on successful authentication of the sender and/or the recipient. For example, the computing device may receive, from the sender, authentication credentials, and may generate the plain data based on a determination that the authentication credentials are valid. This process may add another layer of security to the process, as—even though the computing device might only temporarily store tokenization algorithms, detokenization algorithms, and various tokens/plain data—the computing device only receives and operates on data received from trusted organizations. In practice, this lowers the likelihood that a malicious party might try to gain access to private data through, for example, provision of malicious algorithms.

In some cases, the computing device may condition steps such as receipt of tokenized data, generation of plain data or encryption of plain data, and/or transmission of tokenized data on authentication of the sender and/or recipient and agreed authorization from recipient/sender. For example, the computing device may receive, from the sender, authentication credentials, and the computing device may generate the plain data based on determination that the authentication credentials are valid. The sender may then sends an authorized grant from the recipient providing an acknowledgment from the sender that the recipient will receive tokenized data obtained from the sent tokenized data. The sender may then detokenize the data, optionally tokenize it for the recipient and when authenticated recipient will retrieve tokenized data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to securely transfer tokenized data from a sender to a recipient without disclosing tokenization schemas of either party, the computing device comprising:
   one or more processors; and
   memory storing instructions that, when executed by the one or more processors, cause the computing device to:
      store, in a temporary memory, a detokenization algorithm associated with the sender;
      receive, from the sender, first tokenized data, wherein the first tokenized data was tokenized in accordance with a first tokenization algorithm associated with the sender;
      generate plain data by processing the first tokenized data using the detokenization algorithm;
      based on determining that the plain data has been generated, clear the temporary memory by:
         storing, in a first portion of the temporary memory, the plain data; and
         removing all other data, including the detokenization algorithm associated with the sender, from a second portion of the temporary memory;
      based on a determination that all information associated with the detokenization algorithm is unrecoverable from the temporary memory, store, in the second portion of the temporary memory, a second tokenization algorithm associated with the recipient, wherein the second tokenization algorithm is different from the first tokenization algorithm;
      generate second tokenized data by processing, using the second tokenization algorithm, the plain data;
      send, to the recipient, the second tokenized data; and
      remove, from the temporary memory, the second tokenization algorithm, the plain data, and the second tokenized data by clearing both the first portion of the temporary memory and the second portion of the temporary memory.

2. The computing device of claim 1, wherein the instructions, when executed by the one or more processors, further cause the computing device to:
   receive, from the sender, authentication credentials, wherein the instructions, when executed by the one or more processors, cause the computing device to generate the plain data based on a determination that the authentication credentials are valid.

3. The computing device of claim 1, wherein the second tokenization algorithm is associated with a machine learning model, and wherein the instructions, when executed by the one or more processors, cause the computing device to send the second tokenized data by training the machine learning model based on the second tokenized data.

4. The computing device of claim 1, wherein the first tokenization algorithm creates a unique token for input data, and wherein the second tokenization algorithm creates a different unique token for the same input data.

5. The computing device of claim 1, wherein the instructions, when executed by the one or more processors, cause the computing device to generate the plain data by performing one or more steps of the first tokenization algorithm in reverse.

6. The computing device of claim 1, wherein the instructions, when executed by the one or more processors, cause the computing device to generate the second tokenized data by replacing, based on a table, one or more characters of the plain data with one or more second characters.

7. The computing device of claim 1, wherein the instructions, when executed by the one or more processors, cause the computing device to remove, from the temporary memory, the detokenization algorithm by causing the computing device to one or more of:
   wipe the temporary memory, or
   replace all values of the temporary memory with dummy values.

8. A method for securely transferring tokenized data from a sender to a recipient without disclosing tokenization schemas of either party, the method comprising:
   storing, in a temporary memory, a detokenization algorithm associated with the sender;
   receiving, from the sender, first tokenized data, wherein the first tokenized data was tokenized in accordance with a first tokenization algorithm associated with the sender;
   generating plain data by processing the first tokenized data using the detokenization algorithm;
   based on determining that the plain data has been generated, clearing the temporary memory by:
      storing, in a first portion of the temporary memory, the plain data; and
      removing all other data, including the detokenization algorithm associated with the sender, from a second portion of the temporary memory;
   based on a determination that all information associated with the detokenization algorithm is unrecoverable from the temporary memory, storing, in the second portion of the temporary memory, a second tokenization algorithm associated with the recipient, wherein the second tokenization algorithm is different from the first tokenization algorithm;

generating second tokenized data by processing, using the second tokenization algorithm, the plain data;

sending, to the recipient, the second tokenized data; and removing, from the temporary memory, the second tokenization algorithm, the plain data, and the second tokenized data by clearing both the first portion of the temporary memory and the second portion of the temporary memory.

9. The method of claim 8, further comprising:

receiving, from the sender, authentication credentials, wherein the generating the plain data is based on a determination that the authentication credentials are valid.

10. The method of claim 8, wherein the second tokenization algorithm is associated with a machine learning model, and wherein the sending the second tokenized data comprises training the machine learning model based on the second tokenized data.

11. The method of claim 8, wherein the first tokenization algorithm creates a unique token for input data, and wherein the second tokenization algorithm creates a different unique token for the same input data.

12. The method of claim 8, wherein the generating the plain data comprises performing one or more steps of the first tokenization algorithm in reverse.

13. The method of claim 8, wherein the generating the second tokenized data comprises replacing, based on a table, one or more characters of the plain data with one or more second characters.

14. The method of claim 8, wherein the removing, from the temporary memory, the detokenization algorithm comprises one or more of:

wiping the temporary memory, or replacing all values of the temporary memory with dummy values.

15. One or more non-transitory computer-readable media storing instructions configured to securely transfer tokenized data from a sender to a recipient without disclosing tokenization schemas of either party, wherein the instructions, when executed by one or more processors of a computing device, cause the computing device to:

store, in a temporary memory, a detokenization algorithm associated with the sender;

receive, from the sender, first tokenized data, wherein the first tokenized data was tokenized in accordance with a first tokenization algorithm associated with the sender;

generate plain data by processing the first tokenized data using the detokenization algorithm;

based on determining that the plain data has been generated, clear the temporary memory by:

storing in a first portion of the temporary memory, the plain data; and removing all other data, including the detokenization algorithm associated with the sender, from a second portion of the temporary memory;

based on a determination that all information associated with the detokenization algorithm is unrecoverable from the temporary memory, store, in the second portion of the temporary memory, a second tokenization algorithm associated with the recipient, wherein the second tokenization algorithm is different from the first tokenization algorithm;

generate second tokenized data by processing, using the second tokenization algorithm, the plain data;

send, to the recipient, the second tokenized data; and remove, from the temporary memory, the second tokenization algorithm, the plain data, and the second tokenized data by clearing both the first portion of the temporary memory and the second portion of the temporary memory.

16. The one or more non-transitory computer-readable media of claim 15, wherein the instructions, when executed by the one or more processors, further cause the computing device to:

receive, from the sender, authentication credentials, wherein the instructions, when executed by the one or more processors, cause the computing device to generate the plain data based on a determination that the authentication credentials are valid.

17. The one or more non-transitory computer-readable media of claim 15, wherein the second tokenization algorithm is associated with a machine learning model, and wherein the instructions, when executed by the one or more processors, cause the computing device to send the second tokenized data by training the machine learning model based on the second tokenized data.

18. The one or more non-transitory computer-readable media of claim 15, wherein the first tokenization algorithm creates a unique token for input data, and wherein the second tokenization algorithm creates a different unique token for the same input data.

19. The one or more non-transitory computer-readable media of claim 15, wherein the instructions, when executed by the one or more processors, cause the computing device to generate the plain data by performing one or more steps of the first tokenization algorithm in reverse.

20. The one or more non-transitory computer-readable media of claim 15, wherein the instructions, when executed by the one or more processors, cause the computing device to generate the second tokenized data by replacing, based on a table, one or more characters of the plain data with one or more second characters.

* * * * *